United States Patent [19]
Watanabe et al.

[11] Patent Number: 5,684,099
[45] Date of Patent: Nov. 4, 1997

[54] PROPYLENE BLOCK COPOLYMER, PROCESS FOR PRODUCING THE SAME, AND RESIN COMPOSITION COMPRISING THE SAME

[75] Inventors: Kazuyuki Watanabe; Hisayoshi Yanagihara; Ryuji Sakaguchi, all of Oita, Japan

[73] Assignee: Showa Denko K.K., Tokyo, Japan

[21] Appl. No.: 524,627

[22] Filed: Sep. 7, 1995

[30] Foreign Application Priority Data

Sep. 8, 1994 [JP] Japan .................................. 6-214499
Sep. 16, 1994 [JP] Japan .................................. 6-222138

[51] Int. Cl.$^6$ .................................................. C08F 4/06
[52] U.S. Cl. .......................... 526/135; 525/323; 526/90; 526/145; 526/146; 526/147
[58] Field of Search .................... 525/323; 526/90, 526/135, 145, 146, 147

[56] References Cited

U.S. PATENT DOCUMENTS 5,300,568 4/1994 Abe et al. .................................. 525/68

FOREIGN PATENT DOCUMENTS

| | | |
|---|---|---|
| 0461883A3 | 12/1991 | European Pat. Off. . |
| 0483523A1 | 5/1992 | European Pat. Off. . |
| 0534776A1 | 3/1993 | European Pat. Off. . |
| 0546191A1 | 6/1993 | European Pat. Off. . |

*Primary Examiner*—Edward J. Cain
*Attorney, Agent, or Firm*—Sughrue, Mion, Zinn, Macpeak & Seas

[57] ABSTRACT

A propylene block copolymer comprising: (a) a propylene homopolymer part having (i) an insoluble amount on xylene extraction at 25° C. of 99.0% by weight or more; (ii) an isotactic pentad fraction of 98.0% or more; (iii) an isotactic average chain length of 500 or more; and (iv) a total amount of fractions having an isotactic average chain length of 800 or more obtained in a column chromatographic separation of 10% by weight or more, and (b) a copolymer part comprising propylene and at least one of ethylene and an α-olefin having from 4 to 12 carbon atoms, the proportion of the propylene homopolymer part (a) being from 50 to 97% by weight based on the total amount of the propylene homopolymer part (a) and the copolymer part (b), and the proportion of the copolymer part (b) being from 3 to 50% by weight based on the total amount of the propylene homopolymer part (a) and the copolymer part (b).

6 Claims, 3 Drawing Sheets

PROPYLENE BLOCK COPOLYMER, PROCESS FOR PRODUCING THE SAME, AND RESIN COMPOSITION COMPRISING THE SAME

FIELD OF THE INVENTION

The present invention relates to a propylene block copolymer which is especially suitable for use in the fields of machine parts, electrical or electronic parts, and packaging materials, and as an engineering plastic substitute, etc., and which is excellent in rigidity, impact resistance, heat resistance, and surface hardness. The present invention also relates to a process for producing the block copolymer and a composition comprising the block copolymer.

BACKGROUND OF THE INVENTION

Polypropylene is generally inexpensive and has advantages of being lightweight and having transparency, mechanical strength, heat resistance, chemical resistance, and other properties. Owing to these advantages, polypropylene is extensively utilized as industrial materials such as, e.g., automotive parts and electrical or electronic parts and as various packaging materials, etc. However, polypropylene involves a problem in impact resistance.

Propylene block copolymers improved in the insufficient impact resistance of the conventional polypropylene are extensively utilized, for example, as industrial materials such as automotive parts and electrical or electronic parts.

These propylene block copolymers are usually produced by a multi-stage polymerization process, in which propylene is polymerized in the first-stage reaction and propylene is then copolymerized with an α-olefin in the second-stage reaction. Examples of this polymerization process are described, e.g., in JP-B-36-15284, JP-B-38-14834, JP-B-37-11436, JP-A-53-35788, JP-A-53-35789, JP-A-48-25781, and JP-A-56-55416. (The term "JP-B" and "JP-A" as used herein mean an "examined Japanese patent publication" and an "unexamined published Japanese patent application," respectively.)

However, the propylene block copolymers obtained by those processes tend to have reduced rigidity and reduced heat resistance, although excellent in impact resistance. Improvements in the insufficient rigidity and heat resistance have hence been desired.

In addition, weight reduction of products and improvements in various properties are desired in recent years.

Methods proposed for improving the characteristics of a polypropylene block copolymer include a technique of incorporating an ethylene-propylene rubber and a nucleating agent into, e.g., an ethylene-propylene block copolymer (as described, e.g., in JP-B-60-3420) and a technique of incorporating an ethylene-propylene rubber, an ethylene copolymer, and an inorganic filler into an ethylene-propylene block copolymer (as described, e.g., in JP-A-4-275351, JP-A-5-5051, JP-A-5-98097, and JP-A-5-98098).

However, the above-described techniques each is effective only in improving part of the properties, and heat resistance and rigidity still remain insufficient.

The present invention has been achieved under the circumstances described above.

SUMMARY OF THE INVENTION

An object of the present invention is to provide a propylene block copolymer excellent in rigidity, impact resistance, heat resistance, and surface hardness.

Another object of the present invention is to provide a process for producing such a propylene block copolymer.

Further object of the present invention is to provide a resin composition comprising such a propylene block copolymer.

Other objects and effects of the present invention will be apparent from the following description.

As a result of intensive studies made by the present inventors, it has been found that the above objects can be accomplished with a propylene block copolymer containing propylene homopolymer parts having specific properties. The present invention has been completed based on this finding.

The present invention relates to a propylene block copolymer comprising:

(a) a propylene homopolymer part having
  (i) an insoluble amount on xylene extraction at 25° C. of 99.0% by weight or more;
  (ii) an isotactic pentad fraction of 98.0% or more;
  (iii) an isotactic average chain length of 500 or more; and
  (iv) a total amount of fractions having an isotactic average chain length of 800 or more obtained in a column chromatographic separation of 10% by weight or more, and (b) a copolymer part comprising propylene and at least one of ethylene and an α-olefin having from 4 to 12 carbon atoms, the proportion of the propylene homopolymer part (a) being from 50 to 97% by weight based on the total amount of the propylene homopolymer part (a) and the copolymer part (b), and the proportion of the copolymer part (b) being from 3 to 50% by weight based on the total amount of the propylene homopolymer part (a) and the copolymer part (b).

In a preferred embodiment of the present invention, the copolymer part (b) has
  (v) an average propylene content (FP) according to the two-site model of from 20 to 80% by mole;
  (vi) a propylene content ($P_P$) of a copolymer ($P_H$) formed at an active site, at which propylene is predominantly polymerized in the two-site model, of from 65 to 90% by mole;
  (vii) a proportion of the copolymer ($P_H$) in the copolymer part (b) of from 0.40 to 0.90; and
  (viii) a block property (CSD) of from 1.8 to 5.0.

The present invention also relates to a process for producing the above-mentioned propylene block copolymer, the process comprising the steps of:

treating a solid catalyst comprising a magnesium compound, a titanium compound, a halogen-containing compound, and an electron-donating compound, with a titanium compound represented by formula $TiX_a \cdot Y_b$, wherein X represents Cl, Br, or I; Y represents an electron-donating compound; a represents an integer of 3 or 4; and b represents an integer of 3 or less;

washing the solid catalyst with a halogen-containing compound and then with a hydrocarbon to produce a modified polymerization catalyst; and polymerizing propylene and at least one of ethylene and an α-olefin having from 4 to 12 carbon atoms in the presence of the modified polymerization catalyst.

The present invention further relates to a propylene block copolymer resin composition comprising the above-mentioned propylene block copolymer and a nucleating agent in an amount of from 0.05 to 30% by weight based on the amount of the propylene block copolymer.

DETAILED DESCRIPTION OF THE INVENTION

The propylene block copolymer (hereinafter referred to as "BPP") of the present invention is a copolymer comprising a propylene homopolymer part (a) and a copolymer part (b) which are a copolymer of propylene and at least one of ethylene and an α-olefin having from 4 to 12 carbon atoms. Examples of the α-olefin include 1-butene, 3-methyl-1-butene, 3-methyl-1-pentene, 4-methyl-1-pentene, 4,4-dimethyl-1-pentene, vinylcyclopentane, and vinylcyclohexane. Preferred examples of at least one of ethylene and an α-olefin include 1-butene, and 4-methyl-1-pentene. These at least one of ethylene and α-olefins may be used alone or as a mixture of two or more thereof.

The propylene homopolymer part (a) of the BPP of the present invention, which are substantially a homopolymer of propylene, should satisfy the following property requirements.

(i) The xylene insoluble content as measured at 25° C. (hereinafter referred to as "XI") of the propylene homopolymer part (a) is 99.0% by weight or more, preferably 99.5% by weight or more, more preferably 99.7% by weight or more. If the XI of the homopolymer part (a) is lower than 99.0% by weight, rigidity and heat resistance are impaired.

XI as used herein is measured by a method comprising dissolving the polypropylene in 135° C. o-xylene and then cooling the solution to 25° C. to precipitate a polymer.

(ii) The isotactic pentad fraction (hereinafter referred to as "IP") of the propylene homopolymer part (a) is 98.0% or more, preferably 98.5% or more, more preferably 99.0% or higher. IP thereof lower than 98.0% are undesirable in that rigidity and heat resistance are impaired.

IP is the content of isotactic pentads in all pentads contained in a polypropylene molecular chain. The IP used herein is determined by means of nuclear magnetic resonance using an isotope carbon ($^{13}$C-NMR) according to the method described in A. Zambelli, *Macromolecules*, vol. 6, p. 925 (1973), *ibid*, vol. 8, p. 687 (1975), and *ibid*, vol. 13, p. 267 (1980).

(iii) The isotactic average chain length (hereinafter referred to as "N") of the polypropylene homopolymer part (a) is 500 or more, preferably 700 or more, more preferably 800 or more. If the N thereof is smaller than 500, rigidity and heat resistance are impaired.

N used herein means the average length of parts each having methyl groups bonded in an isotactic manner in polypropylene molecules. The measurement of N was made according to the method described in J. C. Randall, *Polymer Sequence Distribution*, Chapter 2, Academic Press, New York (1977).

Figure 1:
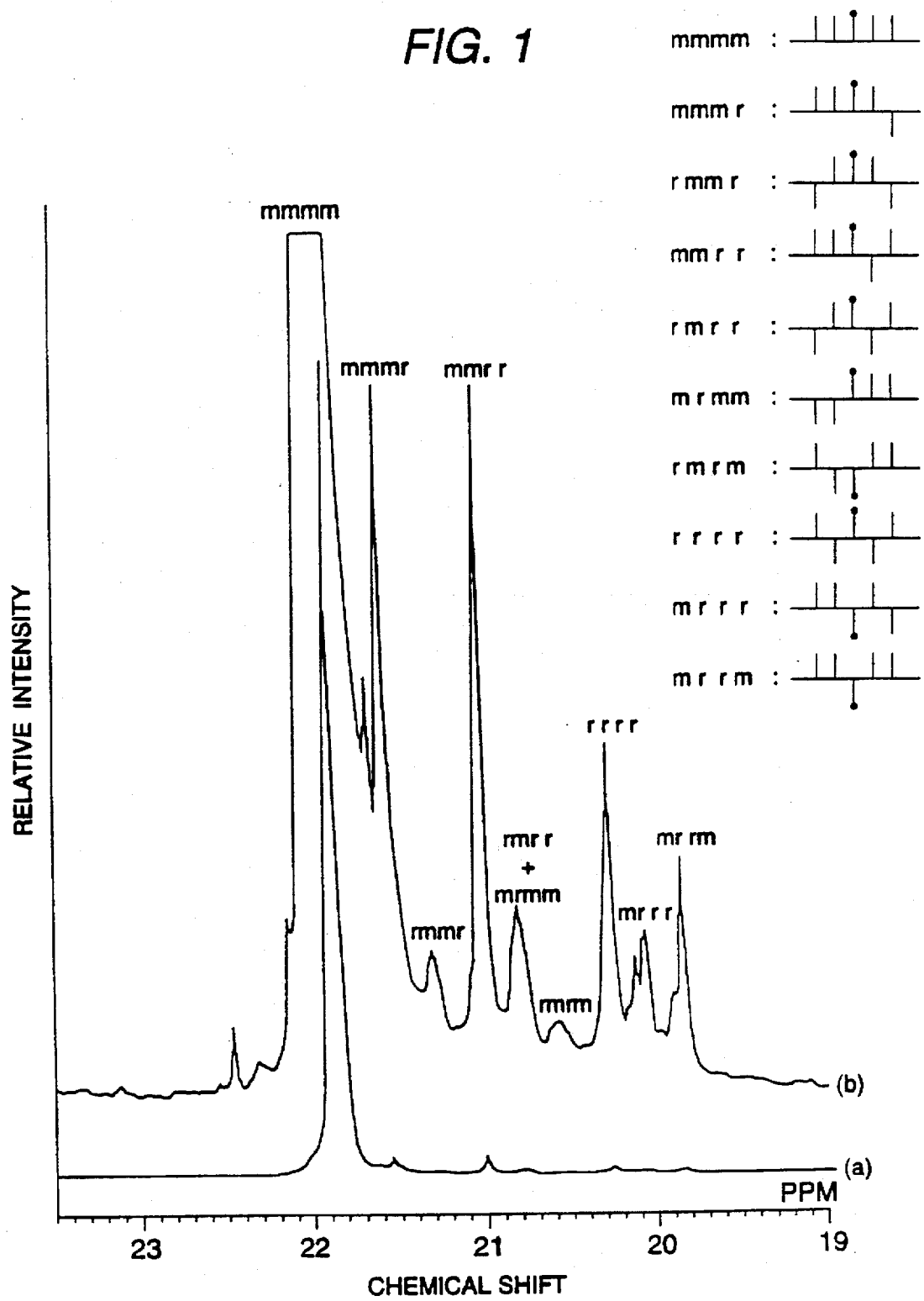
FIG. 1 shows an example of the nuclear magnetic resonance spectrum of a polypropylene in a methyl region thereof.

In this method, a polypropylene is added to a 1,2,4-trichlorobenzene/deuterated benzene mixed solvent in such an amount as to result in a polymer concentration of 10% by weight, and this mixture is heated to 130° C. to dissolve the polymer. This solution is placed into a test tube having a diameter of 10 mm made of glass, and analyzed by $^{13}$C-NMR spectrometry in the same manner as for IP. An example of the thus-obtained spectrum is shown in FIG. 1, wherein a is a spectrum for a methyl group region in the polypropylene and b is an amplification of the spectrum. In this spectrometry, each pentad, which is a set of five successive methyl groups, is analyzed as one unit; the pentads give different absorption peaks according to differences in the isotacticity of methyl groups (there are ten kinds of structures including "mmmm", "mmmr", etc.). Absorption peak assignment to these isotacticities is shown in FIG. 1, b.

There is a polymerization theory called a two-site model and described in Shan-Nong Zhu et al., *Polymer Journal*, vol. 15, No. 12, p. 859–868 (1983). According to this theory, the polymer which is being produced by polymerization has two kinds of active sites, one of which is present on the catalyst side and the other of which is at the polymer terminal. The polymerization which proceeds on the catalyst side is called catalyst-governed polymerization, while the polymerization proceeding on the other side is called terminal-governed polymerization. (Details are given in Junji Furukawa, *Kobunshi No Essensu To Topikkusu* 2 (Essence and Topics of Polymers 2), Kobunshi Gosei (Polymer Syntheses), p. 73, published by Kagaku Dojin K. K. (1986).)

According to the reference cited above, the two-site model can be utilized to theoretically calculate the isotactic intensities of the ten pentads having different isotacticities using the following:

α: the probability of the addition of a D isomer unit and an L isomer unit to the active terminal where catalyst-governed polymerization (enantiomorphic process) proceeds, i.e., an index to the degree of disorder in the isotactic segments;

σ: the probability of the formation of a meso-form part through the addition of a unit to an active terminal having the same unit by means of terminal-governed polymerization (Bernoulli process); and ω: the proportion of α sites.

The values of α, σ, and ω are determined by the least square method so that the theoretical intensities calculated by the method described above coincide with the intensities measured by the NMR spectrometry described above. From these values, the individual pentads are determined using the equations shown in Table 1 below.

TABLE 1

| | |
|---|---|
| Meso- | $A_1$: mmmm = ω (1 − 5β + 5β²) + (1 − ω) σ⁴ |
| form | $A_2$: mmmr = ω (2β − 6β²) + 2 (1 − ω) σ³ (1 − σ) |
| segments | $A_3$: rmmr = ωβ² + (1 − ω) σ² (1 − σ)² |
| Racemic | $A_4$: mmrr = ω (2β − 6β²) + 2 (1 − ω) σ² |
| structure | (1 − σ)² |
| | $A_5$: mmrm = 2ωβ² + 2 (1 − ω) σ³ (1 − σ) |
| | $A_6$: mmr = 2ωβ² + 2 (1 − ω) σ (1 − σ)³ |
| | $A_7$: rmrm = 2ωβ² + 2 (1 − ω) σ² (1 − σ)² |
| | $A_8$: rrrr = ωβ² + 2 (1 − ω) (1 − σ)⁴ |
| | $A_9$: mrrr = ωβ² + 2 (1 − ω) σ (1 − σ)³ |
| | $A_{10}$: mrrm = ω (B − 3β²) + (1 − ω) σ² (1 − σ)² | wherein β = α (1 − α)

wherein

β=α(1−α)

The average isotactic-chain length (N) may be determined using the following equation described in the above-cited reference by J. C. Randall.

$$N = \frac{\text{number of meso-form segments}}{\text{number of meso-form units}}$$

However, the value of N can be virtually determined using the following equation.

$$N=1+(A_1+A_2+A_3)/0.5 (A_4+A_5+A_6+A_7)$$

(iv) The total amount of fractions obtained by column chromatographic separation that have an isotactic average chain length (hereinafter referred to as "$N_f$") of 800 or more should be 10% by weight or more based on the total amount of all fractions, and it is preferably 30% by weight or more, more preferably 50% by weight or more. If the total amount of fractions having an $N_f$ of 800 or larger is smaller than 10% by weight, the effect of improving rigidity, surface hardness, and heat resistance is insufficient.

The column chromatographic separation used herein is a method which comprises dissolving the xylene insoluble content in p-xylene at a temperature of 130° C., adding a Celite thereto, cooling the mixture to 30° C. at a rate of 10° C./hr to allow the polymer to deposit on the Celite, packing a slurry of the Celite into a column, and passing p-xylene as a developer through the column while increasing the temperature of the developer step-wise by 2.5° C. from 30° C. to separate the polypropylene into fractions. Details of this method are given in Masahiro Kakugo et al., *Macromolecules*, vol. 21, p. 314–319 (1988). $N_f$ of the polypropylene fractions is determined using the above-described method for measuring N.

In the BPP of the present invention, the copolymer part (b) (hereinafter sometimes referred to as "propylene-α-olefin copolymer"), which is yielded in the second-stage reaction, preferably satisfies all of the following requirements.

Figure 2:
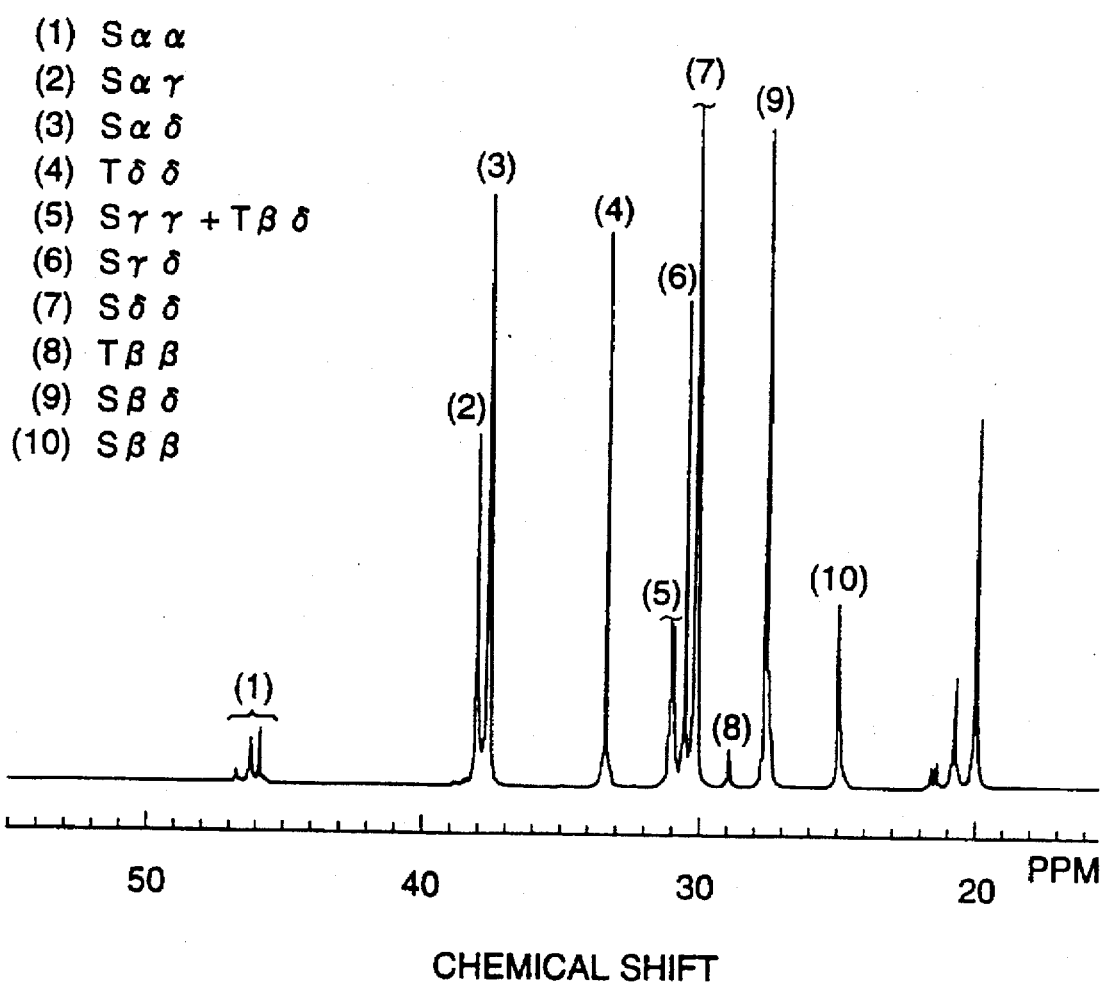
FIG. 2 shows an example of the nuclear magnetic resonance spectrum of an ethylene-propylene copolymer.
Figure 3:
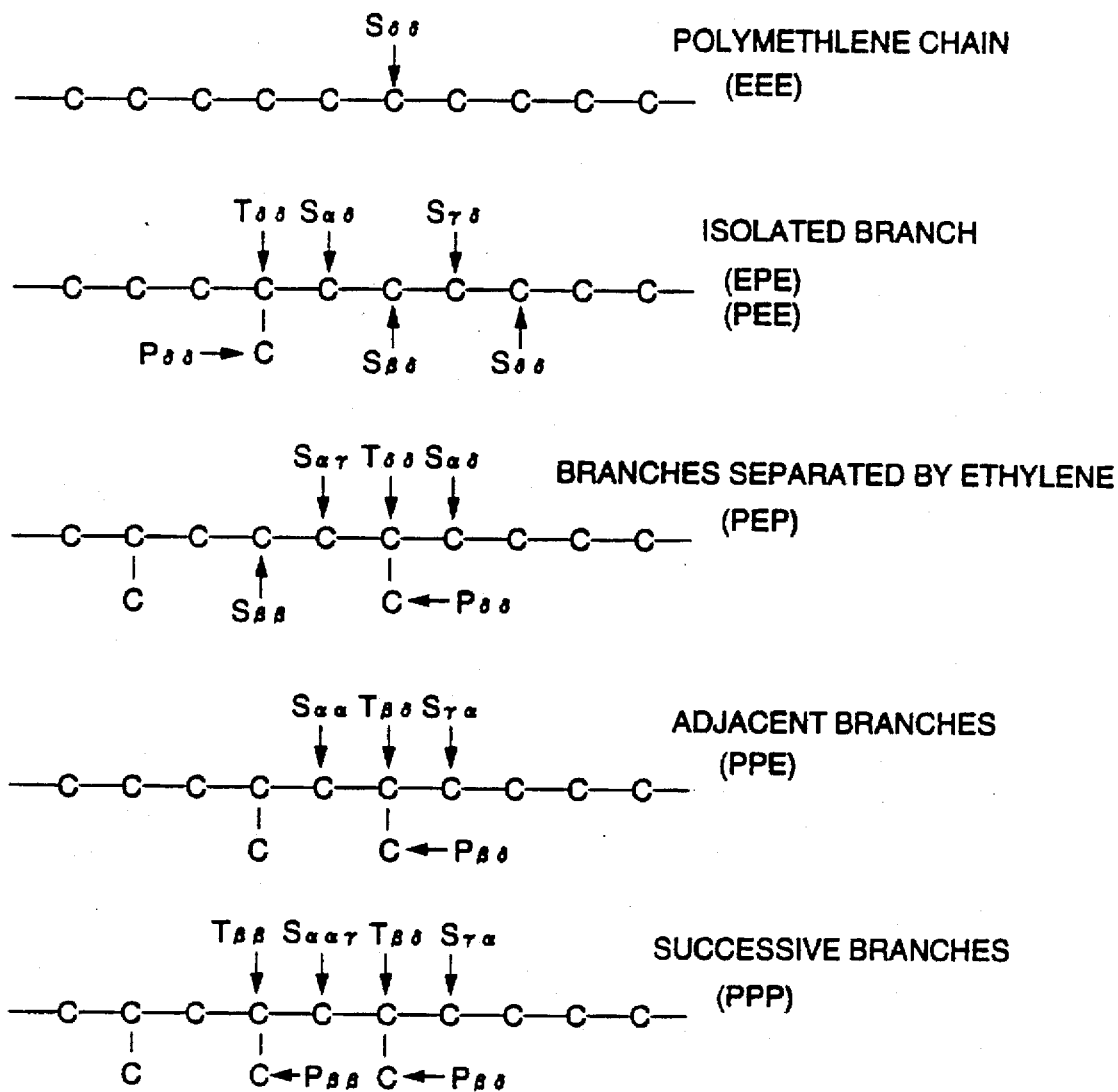
FIG. 3 is an illustration showing carbon appellations derived from segment distributions in polyolefins.

A two-site model of a propylene-α-olefin copolymer is then explained using a propylene-ethylene copolymer as an example thereof. In FIG. 2 is shown an example of the isotope-carbon nuclear magnetic resonance ($^{13}$C-NMR) spectrum of a propylene-ethylene copolymer. This spectrum has ten peaks respectively indicated by (1) to (10) due to differences in segment distribution (arrangement of ethylene and propylene units). The appellations of these carbons are described in Carman C. J. et al., *Macromolecules*, vol. 10, p. 536–544 (1977), and are shown in FIG. 3. These segments can be expressed by reaction probabilities (P) determined from a presumed mechanism of copolymerization reaction. Namely, when the total intensity of all peaks is regarded as 1, the relative intensity of each of the peaks (1) to (10) can be expressed by means of a probability equation based on Bernoulli statistics using P as a parameter.

For example, in the case of peak Sαα (1), there are three kinds of possible segments, [pppp], [ppee], and [eppe], where symbols p and e indicate a propylene unit and an ethylene unit, respectively. These segments each is expressed by reaction probabilities (P), and are summed. With respect to the remaining peaks (2) to (10), equations are set up in the same manner. P is then optimized so that these ten equations agree most closely with the actually measured peak intensities. Thus, the values of P can be determined.

The two-site model, which serves to presume the above-described reaction mechanism, is described in H. N. Cheng, *Journal of Applied Polymer Science*, vol. 35, p. 1639–1650 (1988). This model relates to the catalyzed copolymerization of propylene and ethylene. When the propylene content ($P_P$) of the copolymer ($P_H$) generated at the active site where propylene is preferentially polymerized and the propylene content ($P_P'$) of the copolymer generated at the active site where ethylene is preferentially polymerized are presumed and the proportion ($P_{fl}$) of $P_H$ in the copolymer is used as a parameter, then the probability equations shown in Table 2 are obtained.

TABLE 2

| Signal | | Probability equation for two-site model |
|---|---|---|
| (1) | Sαα | $P_p^2 \times P_{fl} + P_p'^2 \times (1-P_{fl})$ |
| (2) | Sαγ | $(-2P_p^3 + 2P_p^2) \times P_{fl} + (-2P_p'^3 + 2P_p'^2) \times (1-P_{fl})$ |
| (3) | Sαδ | $(2P_p^3 - 4P_p^2 + 2P_p) \times P_{fl} + (2P_p'^3 - 4P_p'^2 + 2P_p') \times (1-P_{fl})$ |
| (4) | Tδδ | $(P_p^3 - 2P_p^2 + P_p) \times P_{fl} + (P_p'^3 - 2P_p'^2 + P_p') \times (1-P_{fl})$ |
| (5) | Sγγ + Tβδ | $(P_p^4 - 4P_p^3 + 3P_p^2) \times P_{fl} + (P_p'^4 - 4P_p'^3 + 3P_p'^2) \times (1-P_{fl})$ |
| (6) | Sγδ | $(-2P_p^4 + 6P_p^3 - 6P_p^2 + 2P_p) \times P_{fl} + (-2P_p'^4 + 6P_p'^3 - 6P_p'^2 + 2P_p') \times (1-P_{fl})$ |
| (7) | Sδδ | $(2P_p^4 - 5P_p^3 + 9P_p^2 - 7P_p + 2) \times P_{fl} + (P_p'^4 - 5P_p'^3 + 9P_p'^2 - 7P_p' + 2) \times (1-P_{fl})$ |
| (8) | Tββ | $P_p^3 \times P_{fl} + P_p'^3 \times (1-P_{fl})$ |
| (9) | Sβδ | $(2P_p^3 - 4P_p^2 + 2P_p) \times P_{fl} + (2P_p'^3 - 4P_p'^2 + 2P_p') \times (1-P_{fl})$ |
| (10) | Sββ | $(-P_p^3 + P_p^2) \times P_{fl} + (-P_p'^3 + P_p'^2) \times (1-P_{fl})$ |

The three parameters, $P_P$, $P_P'$, and $P_{fl}$, are optimized so that the above-described relative intensities of the peaks in the $^{13}$C-NMR spectrum coincide with the probability equations shown in Table 2. Thus, the values of $P_P$, $P_P'$, and $P_{fl}$ can be determined.

(v) The average propylene content (FP) in this invention is determined from the three parameters using the following equation.

$$FP = P_P \times P_{fl} + P_P' \times (1-P_{fl}) \text{ (mol \%)}$$

The value of FP determined using the above equation is from 20 to 80% by mole, preferably from 25 to 75% by mole, more preferably from 30 to 70% by mole. If FP is lower than 20% by mole, a significantly impaired molding appearance results. FP values exceeding 80% by mole are undesirable in that impact resistance is reduced.

(vi) The value of $P_P$, of the aforementioned parameters, is from 65 to 90% by mole, preferably from 68 to 88% by mole, more preferably from 70 to 85% by mole. If $P_P$ is lower than 65% by mole, rigidity and heat resistance are reduced. $P_P$ values exceeding 90% by mole are undesirable in that impact resistance is impaired.

(vii) The value of $P_{fl}$ is from 0.40 to 0.90, preferably from 0.45 to 0.85, more preferably from 0.48 to 0.82. If the value of $P_{fl}$ is smaller than 0.40, rigidity and heat resistance are impaired. $P_{fl}$ values exceeding 0.90 are undesirable in that impact resistance is impaired.

(viii) The block property (CSD) indicates reactivity ratio between ethylene and propylene. This block property used herein is determined by the method described in Polymer Society of Japan, *Kyojugo* 1, Hanno Kaiseki (Copolymerization 1, Analyses of Reactions), p. 5–13, published by Baifu-kan (1975). Namely, CSD is expressed by the following equation using the relative intensities (Ri) of the peaks in the spectrum shown in FIG. 2.

$$CSD = ((0.5 \times R7 + 0.25 \times R6 + 0.5 \times R3) \times R1)/(0.5 \times (R2+R3))^2$$

The value of CSD obtained using the above equation is from 1.8 to 5.0, preferably from 2.0 to 4.5, more preferably from 2.5 to 4.0. If CSD is below 1.8, rigidity and heat resistance are reduced. CSD values exceeding 5.0 are undesirable in that low-temperature impact resistance is impaired.

The proportion of the propylene-α-olefin copolymer part (b) in the BPP of the present invention is from 3 to 50% by weight, preferably from 5 to 45% by weight, more preferably from 10 to 40% by weight. If the proportion of copolymer parts (b) is smaller than 3% by weight, impact strength and flexibility are reduced. Proportions thereof exceeding 50% by weight are undesirable in that rigidity and heat resistance are impaired.

The BPP of the present invention can be obtained by a conventional multi-stage polymerization process. That is, propylene is first polymerized in the first-stage reaction, and then propylene and α-olefin are copolymerized in the second-stage reaction. Examples of the polymerization method include a solution polymerization method, such as slurry polymerization and bulk polymerization, as well as a gas-phase polymerization method. In the case of a slurry polymerization method, examples of a solvent used include inert hydrocarbons, such as hexane, heptane, cyclohexane, and toluene; and liquid α-olefin such as propylene.

The polymerization can be conducted in the presence of the solid catalyst described later, an organoaluminum compound, and organosilicon compound. The concentration of the solid catalyst upon polymerization is generally about from 0.001 to 50 mmol, preferably about from 0.01 to 10 mmol, in terms of titanium atom contained in the solid catalyst, per 1 litter of the solvent. The amount of the organoaluminum compound is generally about from 1 to 2,000 mol, preferably about from 2 to 500 mol, per mole of titanium atom contained in the solid catalyst. The amount of organosilicon compound is generally about from 0.001 to 10 mol, preferably about from 0.01 to 5 mol, per mole of titanium atom contained in the solid catalyst. The polymerization temperature is generally from −50° to 200° C., preferably from 20° to 150° C. The polymerization pressure is generally from atmospheric pressure to 100 kg/cm$^2$, preferably from 2 to 50 kg/cm$^2$. The molecular weight of the resulting polymer can be controlled by introducing hydrogen in an appropriate amount into the polymerization system.

Examples of the organoaluminum compound include a trialkyl aluminum such as trimethyl aluminum, triethyl aluminum, tripropyl aluminum, tributyl aluminum, trihexyl aluminum, and trioctyl aluminum; and an aluminoxane such as methyl aluminoxane, ethyl aluminoxane, and propyl aluminoxane. These organoaluminum compounds can be used singly or in combination of two or more of them. Among these, triethyl aluminum and tributyl aluminum are preferably used.

Examples of the organosilicon compound include compounds having an Si-O-C bond, such as phenyltrimethoxysilane, diphenyldimethoxysilane, di-n-propyldimethoxysilane, di-i-propyldimethoxysilane, di-t-butyldimethoxysilane, dicyclohexyldimethoxysilane, dicyclopentyldimethoxysilane, cyclohexylmethyldimethoxysilane, thexyltrimethoxysilane, t-butyltrimethoxysilane, cyclohexyltrimethoxysilane, tetramethoxysilane, and tetraethoxysilane. These organosilicon compound can be used singly or in combination of two or more of them. Among these, di-i-propyldimethoxysilane, dicyclopentyldimethoxysilane, thexyltrimethoxysilane, and t-butyltrimethoxysilane are preferably used.

A reaction vessel for use in the polymerization can be any conventional apparatuses that has been used in this field of art. Examples thereof include a stirring tank type, a fluidized bed type, a circulation type, etc. Any of a continuous polymerization system, a semi-batchwise polymerization system, or a batchwise polymerization system can be employed with using these polymerization vessels.

The multi-stage polymerization process is described, e.g., in JP-B-36-15284, JP-B-38-14834, JP-A-53-35788, and U.S. Pat. Nos. 4,337,326, 4,576,994, and 4,761,461.

The BPP of the present invention cannot be obtained with any of the known Ziegler-Natta catalysts, e.g., a titanium trichloride catalyst or a magnesium chloride-supported titanium catalyst. Examples of catalysts that can be used for obtaining the BPP of the present invention include an improved polymerization catalyst obtained by treating a solid catalyst comprising as essential ingredients a magnesium compound, a titanium compound, a halogen-containing compound, and an electron-donating compound, with a titanium compound represented by formula TiX$_a$·Y$_b$ (wherein X represents a halogen atom selected from Cl, Br, and I; Y represents an electron-donating compound; a represents an integer of 3 or 4; and b represents an integer of 3 or less), followed by washing with a halogen compound and then with a hydrocarbon.

The TiX$_a$ in the formula given above is known as a compound which readily forms complexes with ordinary electron-donating compounds, as described in, e.g., R.S.P. Coutts, et al., *Advan. Organometal. Chem.*, vol. 9, p. 135 (1970); Chemical Society of Japan, *Dai-4-han Shin Jikken Kagaku Koza* 17, *Muki Sakutai.Kireto Sakutai* (Lecture on New Experimental Chemistry 17, Inorganic Complexes/Chelate Complexes, 4th edition), published by Maruzen, Japan (1991) p. 35; and H. K. Kakkonen, et al., *J. Organomet. Chem.*, vol. 453, p. 175 (1993).

X represents a halogen atom selected from Cl, Br, and I. Preferred of these is Cl. Symbol a is 3 or 4, preferably 4. Examples of Y generally include oxygen compounds, nitrogen compounds, phosphorus compounds, and sulfur compounds. Examples of the oxygen compounds include alcohols, ethers, esters, acid halides, and acid anhydrides. Specific examples thereof include alcohols such as methyl alcohol, ethyl alcohol, propyl alcohol, butyl alcohol, pentyl alcohol, hexyl alcohol, heptyl alcohol, octyl alcohol, nonyl alcohol, decyl alcohol, 2-ethylhexyl alcohol, oleyl alcohol, benzyl alcohol, phenylethyl alcohol, phenol, cresol, ethylphenol, and naphthol; ethers such as methyl ether, ethyl ether, propyl ether, butyl ether, amyl ether, hexyl ether, tetrahydrofuran, anisole, and diphenyl ether and diethers; esters such as ethyl acetate, ethyl chloroacetate, ethyl propionate, ethyl butyrate, ethyl acrylate, ethyl crotonate, ethyl oleate, ethyl stearate, ethyl phenylacetate, methyl benzoate, ethyl benzoate, propyl benzoate, butyl benzoate, methyl toluylate, ethyl toluylate, propyl toluylate, butyl toluylate, methyl ethylbenzoate, methyl anisate, ethyl anisate, methyl ethoxybenzoate, ethyl ethoxybenzoate, ethyl cinnamate, dimethyl phthalate, diethyl phthalate, dipropyl phthalate, di-n-butyl phthalate, diisobutyl phthalate, dihexyl phthalate, dioctyl phthalate, γ-butyrolactone, δ-valerolactone, and ethylene carbonate; acid chlorides such as acetyl chloride, benzoyl chloride, toluoyl chloride, and phthaloyl chloride; and acid anhydrides such as maleic anhydride and phthalic anhydride. These electron-donating compounds may be used alone or in combination of two or more thereof. Of these electron-donating compounds, esters are preferred, with phthalic esters being especially preferred. Symbol b attached to Y is preferably from 1 to 3 when a is 3, and is preferably 1 or 2 when a is 4. Especially preferred is the case in which a is 4 and b is 1.

The above-mentioned improved polymerization catalyst is preferably subjected to preliminary polymerization with a small amount of a monomer before used for polymerization. As the method for preliminary polymerization, any conventional methods can be employed. In the case where slurry polymerization is employed for preliminary polymerization, the above-described solvents for the polymerization can be employed in the preliminary polymerization. The temperature for the preliminary polymerization is not particularly limited, and is generally from −30° to 110° C., preferably from −20° to 90° C., more preferably from −10° to 80° C. The amount of monomer to be subjected to the preliminary polymerization is generally about from 0.1 to 1,000 g, preferably about from 0.1 to 500 g, per 1 g of the catalyst. The preliminary polymerization is generally conducted in the presence of the organoaluminum compound and organosilicon compound to be used in the polymerization. The concentration of the solid catalyst is generally about from 0.01 to 500 mmol, preferably about from 0.05 to 100 mmol, in terms of titanium atom, per 1 litter of the solvent. The amount of the organoaluminum compound is generally about from 0.1 to 100 mol, preferably about from 0.5 to 50 mol, per mole of titanium atom contained in the solid catalyst. The amount of the organosilicon compound is generally about from 0.1 to 100 mol, preferably about from 0.5 to 40 mol, per mole of titanium atom contained in the solid catalyst.

Examples of the monomer used in the preliminary polymerization include ethylene or α-olefins such as propylene and 1-butene. Hydrogen as a molecular weight controlling agent can also be used.

The melt flow rate (hereinafter referred to as "MFR") according to JIS K7210 of the BPP of the present invention is generally from 0.1 to 500 g/10 min, preferably from 0.1 to 450 g/10 min, more preferably from 0.1 to 400 g/10 min, while depending on the molding methods and the usage. For example, an MFR used for injection molding is generally from 1.0 to 150 g/10 min, that for inflation film molding is generally from 0.1 to 10 g/10 min, that for cast film molding is generally from 1.0 to 20 g/10 min, and that for blow molding is generally from 0.1 to 10 g/10 min.

Incorporation of a nucleating agent into the BPP of the present invention enhances the rigidity, heat resistance, and impact strength of the BPP. The nucleating agent may be any of various substances which are added to crystalline synthetic resins and have the effect of serving as nuclei to promote the growth of crystals.

Examples thereof include metal salts of carboxylic acids, dibenzylidenesorbitol derivatives, metal phosphates, and inorganic fillers such as talc and calcium carbonate. These nucleating agents may be used aloof two or in combination of two or more thereof. Preferred examples of the nucleating agent include 1,3,2,4-dibenzylidenesorbitol, 1,3,2,4-di-(p-methylbenzylidene)sorbitol, aluminum hydorxydi-p-t-butylbenzoate, polyvilylcyclohexane, polyvinylcyclopentane, sodium 2,2-methylenebis-(4,6-di-t-butylphenyl)phsophate, and talc.

The addition amounts of these nucleating agents are as follows. The nucleating agents other than inorganic fillers are added in an amount of generally from 0.05 to 0.5% by weight, preferably from 0.08 to 0.4% by weight, more preferably from 0.1 to 0.35% by weight, based on the amount of the BPP. The inorganic fillers including talc are added in an amount of generally from 5 to 30% by weight, preferably from 7 to 28% by weight, more preferably from 9 to 25% by weight, based on the amount of the BPP.

The incorporation of such a nucleating agent is accomplished by mixing the ingredients by a known mixing means, e.g., a ribbon blender, a tumbler, or a Henschel mixer, and melt-kneading the mixture with a kneader, mixing rolls, a Banbury mixer, an extruder, or the like. The temperature for melt-kneading is generally from 170° to 280° C., preferably from 190° to 260° C. The composition obtained may be molded into a film, sheet, tube, bottle, or another form by the known melt molding or compression molding method. The molding thus obtained may be used either alone or as a laminate with other materials.

Examples of laminating methods include a dry laminating molding method, an extrusion laminating method, a co-extrusion method, a co-injection molding method, and a co-extrusion pipe molding method. In the dry laminating molding method, the composition is laminated with a substrate, such as paper, an aluminum foil, and other thermoplastic resin sheets, through an adhesive. Examples of the adhesive include polyurethane adhesives, polyester adhesives, polyacryl adhesives, and isocyanate adhesives, which are used after dissolving in a solvent such as toluene, ethyl acetate, and hexane. In the extrusion laminating method, the composition is pressed to the above substrate under heating, and examples thereof include a single extrusion coating method, a tandem extrusion coating method, and a co-extrusion coating method. In the co-extrusion method, two or more kinds of molten resins are simultaneously extruded though the same die to obtain a laminated film. The co-injection molding method and the co-extrusion pipe molding method are involved in the co-extrusion method, in which co-extrusion is conducted by using an injection molding apparatus or a pipe molding apparatus.

The above-mentioned laminating methods are described, e.g., in M. Bakker, ed., *The Wiley Encyclopedia of Packaging Technology*, John Wiley & Sons, Inc., New York (1986); C. J. Benning, *Plastics Films for Packaging*, Technomic Publishing Co., Inc., Lancaster Pa. (1983); and J. H. Briston and Dr. L. L. Katan; *Plastics Films* (Third Edition), Longman Scientific & Technical (1989).

The laminate thus obtained may be further molded into a desired shape through re-heating and stretching by vacuum forming, air-pressure forming, blow molding with stretching, or a similar molding technique.

In the BPP of the present invention, additives ordinarily employed in this field of art can be added in an amount that does not impair the effect of the present invention. Examples thereof include an antioxidant, an ultraviolet absorbent, an antistatic agent, a lubricant, an antiblocking agent, an antifogging agent, a coloring agent, a plasticizer, a flexibilizer, and a filler.

Examples of the antioxidant include 2,5-di-t-butylhydroquinone, 2,6-di-t-butyl-p-cresol, 4,4'-thiobis(6-t-butylphenol), 2,2-methylene-bis(4-methyl-6-t-butylphenol), octadecyl-3-(3',5'-di-t-butyl-1'-hydroxyphenyl)propionate, and 4,4'-thiobis(6-butylphenol). Examples of the ultraviolet absorbent include ethyl-2-cyano-3,3-diphenylacrylate, 2-(2'-hydroxy-5-methylphenyl)-benzotriazol, and 2-hydroxy-4-octoxybenzophenone. Examples of the antistatic agent include pentaerythritol monostearate, sorbitan monoparmitate, oleic sulfate, polyethylene oxide, and carbon wax. Examples of the lubricant include ethylenebisstearoamide and butyl stearate. Examples of the coloring agent include carbon black, phthalocyanine, quinacridone, indolin, azo pigments, titanium oxide, and red oxide. Examples of the plasticizer include dimethyl phthalate, diethyl phthalate, wax, liquid paraffin, and phosphoric esters. Examples of the filler include glass fibers, asbestos, mica, wollastonite, calcium silicate, aluminum silicate, and calcium carbonate.

These additives other than the plasticizer and the filler can generally be added in an amount of from 0.01 to 1% by weight.

The present invention will be explained below in more detail by reference to Examples, but the present invention should not be construed as being limited thereto.

The methods used for measuring or determining various properties are shown below.

MFR

Measurement was made with Melt Indexer manufactured by Takara K. K., Japan in accordance with JIS K7210.

Ethylene Content

Ethylene content was determined by the $^{13}$C-NMR spectrometry described in C. J. Carman et al., *Macromolecules*, vol. 10, p. 537 (1977).

Flexural Modulus

Measurement was made in accordance with JIS K7203.

Izod Impact Strength

Notched Izod impact strength was measured with U-F Impact Tester manufactured by Ueshima Seisakusho K. K., Japan in accordance with JIS K7110.

Falling Weight Impact Strength

A falling weight test was conducted at −20° C. in accordance with ASTM D3029-78. Weight loads were changed 100 g by 100 g, and the load which resulted in the breakage of 50% of twenty test pieces was determined.

Deflection Temperature under Load

Measurement was made under a load of 4.6 kg in accordance with JIS K7207 Method B.

Rockwell Hardness

Measurement was made with scale R in accordance with JIS K7202.

Surface Gloss

Measurement was made with a gloss meter Type VG-1D, manufactured by Nippon Denshoku Kogyo K. K., Japan, in accordance with JIS K7205.

The processes by which the BPP used were produced are given below as Production Examples.

PRODUCTION EXAMPLE 1

(a) Preparation of Solid Catalyst

Into a liquid mixture consisting of 100 g of absolute ethanol, 500 ml of a vaseline oil (CP15N) manufactured by Idemitsu Kosan Co., Ltd., Japan, and 500 ml of a silicone oil (KF96) manufactured by Shin-Etsu Silicone Co., Ltd., Japan was completely dissolved 56.8 g of anhydrous magnesium chloride at 120° C. in a nitrogen atmosphere. This mixture was agitated with TK Homomixer, manufactured by Tokushu Kika Kogyo Co., Ltd., Japan, at 120° C. and 3,000 rpm for 3 minutes. The mixture was then transferred to 2 liters of absolute heptane with agitation and cooling at 0° C. or a lower temperature. As a result, a white solid was obtained, which was sufficiently washed with absolute heptane and then vacuum-dried at room temperature.

Thirty grams of the thus-obtained white solid was suspended in 200 ml of absolute heptane, and 500 ml of titanium tetrachloride was added thereto dropwise over a period of 1 hour with stirring at 0° C. The resulting mixture was gradually heated and, at the time when the temperature of the mixture had reached 40° C., 4.96 g of diisobutyl phthalate was added. This mixture was heated to 100° C. over a period of about 1 hour. The reactants were reacted at 100° C. for 2 hours, and the hot reaction mixture was then filtered to obtain a solid matter. To this solid matter was added 500 ml of titanium tetrachloride. The reactants were reacted at 120° C. for 1 hour with stirring, and the hot reaction mixture was then filtered to obtain a solid matter. This solid matter was washed with 1 liter of 60° C. hexane 7 times and then with 1 liter of room-temperature hexane 3 times.

(b) Preparation of $TiCl_4(C_6H_4(COO-i-C_4H_9)_2)$

To a solution of 19 g of titanium tetrachloride in 1 liter of hexane was added dropwise 27.8 g of diisobutyl phthalate at 0° C. over a period of about 30 minutes. After completion of the addition, the mixture was heated to 40° C. to react the reactants for 30 minutes. Thereafter, the resulting solid matter was taken out and washed with 500 ml of hexane 5 times to obtain the intended substance. ps (c) Preparation of Polymerization Catalyst Component Twenty grams of the solid catalyst obtained in (a) above was suspended in 300 ml of toluene. This suspension was treated at 25° C. for 1 hour with 5.2 g of the $TiCl_4(C_6H_4 (COO-i-C_4H_9)_2)$ obtained in (b) above to fix the solid catalyst to the titanium compound. After completion of the fixation, the mixture was heated and the hot mixture was filtered to obtain the solid matter. This solid matter was suspended in a mixture of 300 ml of toluene and 10 ml of titanium tetrachloride, and the resulting mixture was stirred at 90° C. for 1 hour to wash the solid matter. The hot mixture was filtered to obtain the solid reaction product, which was then washed with 500 ml of 90° C. toluene 5 times and with 500 ml of room-temperature hexane 3 times.

Preliminary polymerization

Into an autoclave having a capacity of 3 liters were introduced in a nitrogen atmosphere 500 ml of n-heptane, 6.0 g of triethylaluminum, 3.9 g of dicyclopentyldimethoxysilane, and 10 g of the polymerization catalyst component obtained in (c) above. The contents were stirred for 5 minutes in the temperature range of from 0° to 5° C. Propylene was then fed to the autoclave in such an amount that 10 g of propylene was polymerized per g of the polymerization catalyst component, and prepolymerization was conducted for 1 hour in the temperature range of from 0° to 5° C. The preliminary polymerized solid catalyst component obtained was washed with 500 ml of n-heptane 3 times, before being used in the main polymerization described below.

Main Polymerization (i) First-stage Polymerization

Into an autoclave having a capacity of 60 liters and equipped with a stirrer were introduced in a nitrogen atmosphere 2.0 g of the prepolymerized solid catalyst prepared by the method described above, 11.4 g of triethylaluminum, and 6.84 g of dicyclopentyldimethoxysilane. Subsequently, 18 kg of propylene was fed to the autoclave along with hydrogen in an amount of 13,000 ppm by mole of the propylene. The contents were heated to 70° C. to perform polymerization for 1 hour. The propylene remaining unreacted was then removed to terminate the polymerization. After completion of the reaction, the reaction product was sampled.

(ii) Second-stage Polymerization

After completion of the first-stage polymerization, the liquid propylene was removed, and an ethylene/propylene mixed gas (40/60 by mole) and hydrogen were fed at rates of 2.2 N.m$^3$/hr and 20 N.l/hr, respectively, to perform copolymerization at 75° C. for 40 minutes. The gas remaining unreacted was then removed to terminate the polymerization. As a result, 8.0 kg of a propylene-ethylene block copolymer having an ethylene content of 9.7% by weight and an MFR of 17.8 g/10 min (hereinafter referred to as "BPP 11") was obtained.

The same procedure as the above was carried out, except that the amount of hydrogen fed for the first-stage polymerization, the polymerization time for the second-stage polymerization, and the amount of ethylene were changed. Thus, a propylene-ethylene block copolymer having an ethylene content of 10.5% by weight and an MFR of 8.1 g/10 min (hereinafter referred to as "BPP 12") and a propylene-ethylene block copolymer having an ethylene content of 8.4% by weight and an MFR of 16.7 g/10 min (hereinafter referred to as "BPP 13") were obtained.

Further, the same procedure as for obtaining BPP 11 was carried out, except that 1-butene was also fed in the second-stage polymerization. Thus, a propylene-ethylene block copolymer having an ethylene content of 8.4% by weight, a 1-butene content of 0.7% by weight, and an MFR of 16.7 g/10 min (hereinafter referred to as "BPP 14") was obtained.

For the purpose of comparison, the following two comparative BPP were used.

The same procedure as for obtaining BPP 11 was carried out, except that 6.0 g of AA Type titanium trichloride manufactured by Tosoh-Akzo Co., Ltd. and 23.5 g of diethylaluminum chloride were used as catalyst components, and that 18 kg of propylene was fed along with hydrogen in an amount of 8,000 ppm by mole of the propylene, before the contents were heated to 70° C. As a result, a copolymer having an ethylene content of 9.8% by weight and an MFR of 18.2 g/10 min (hereinafter referred to as "BPP 5") was obtained. Furthermore, polymerization was conducted in the same manner as for obtaining BPP 11, except that the catalyst prepared in (a) above was used, and that the amount of hydrogen used for the first-stage polymerization was changed to 9,300 ppm by mole. Thus, a copolymer having an ethylene content of 10.1% by weight and an MFR of 18.4 g/10 min (hereinafter referred to as "BPP 6") was obtained.

The propylene homopolymer parts of each of the copolymers described above which homopolymer parts had been obtained by sampling at the time of the completion of the first-stage polymerization were analyzed for XI, IP, N, and $N_f$. The results obtained are shown in Table 3. IP was measured under the following conditions.

Apparatus: JNM-GSX400, manufactured by JEOL Ltd., Japan
Mode of measurement: proton decoupling method
Pulse width: 8.0 µs
Pulse repetition time: 3.0 s
Number of integrations: 20,000
Solvent: 1,2,4-trichlorobenzene/deuterated benzene mixture (75/25 by volume)
Internal circulation: hexamethyldisiloxane
Sample concentration: 300 mg/3.0 ml solvent
Temperature: 120° C.

TABLE 3

| BPP | XI (wt %) | IP (%) | N | $N_f$ (wt %) |
|---|---|---|---|---|
| BPP 11 | 99.5 | 99.5 | 816 | 82 |
| BPP 12 | 99.5 | 99.5 | 678 | 74 |
| BPP 13 | 99.5 | 99.4 | 721 | 77 |
| BPP 14 | 99.4 | 99.3 | 592 | 68 |
| BPP 5* | 98.5 | 97.7 | 211 | ≦1 |
| BPP 6* | 98.8 | 98.8 | 301 | 6 |

Note: *BPP 5 and BPP 6 were comparative samples.

Note: *BPP 5 and BPP 6 were comparative samples.

PRODUCTION EXAMPLE 2

The same procedure as in Production Example 1 was carried out, except that the temperature for the first-stage polymerization in the main polymerization was changed from 70° C. to 75° C. Thus, 8.6 kg of a propylene-ethylene block copolymer having an ethylene content of 9.5% by weight and an MFR of 16.9 g/10 min (hereinafter referred to as "BPP 21") was obtained.

The same procedure as the above was carried out, except that the amount of hydrogen fed for the first-stage polymerization, the polymerization time for the second-stage polymerization, and the amount of ethylene were changed. Thus, a propylene-ethylene block copolymer having an ethylene content of 10.8% by weight and an MFR of 7.3 g/10 min (hereinafter referred to as "BPP 22") and a propylene-ethylene block copolymer having an ethylene content of 6.1% by weight and an MFR of 26.8 g/10 min (hereinafter referred to as "BPP 23") were obtained.

Further, the same procedure as for obtaining BPP 11 was carried out, except that 1-butene was also fed in the second-stage polymerization. Thus, a propylene-ethylene block copolymer having an ethylene content of 7.8% by weight, a 1-butene content of 0.7% by weight, and an MFR of 15.3 g/10 min (hereinafter referred to as "BPP 24") was obtained.

The polypropylene parts of each of the copolymers described above which homopolymer parts had been obtained by sampling at the time of the completion of the first-stage polymerization were analyzed for XI, IP, N, and $N_f$. The results obtained are shown in Table 4. IP was measured under the same conditions as in Production Example 1.

TABLE 4

| BPP | XI (wt %) | IP (%) | N | $N_f$ (wt %) |
|---|---|---|---|---|
| BPP 21 | 99.5 | 99.6 | 886 | 88 |
| BPP 22 | 99.5 | 99.5 | 736 | 78 |
| BPP 23 | 99.5 | 99.4 | 784 | 82 |
| BPP 24 | 99.4 | 99.4 | 658 | 73 |

The ethylene-propylene copolymer parts of each of the copolymers which parts had been formed by the second-stage polymerization were analyzed for FP, $P_p$, $P_{fl}$, and CSD by NMR spectrometry and two-site model analysis. The results obtained are shown in Table 5.

TABLE 5

| BPP | Proportion of copolymer (b) (wt %) | FP (mol %) | $P_p$ (mol %) | $P_{fl}$ | CSD |
|---|---|---|---|---|---|
| BPP 21 | 8 | 50 | 74.8 | 0.54 | 3.51 |
| BPP 22 | 6 | 47 | 71.2 | 0.52 | 3.00 |
| BPP 23 | 38 | 59 | 77.4 | 0.66 | 3.20 |
| BPP 24 | 16 | 52 | 75.8 | 0.61 | 3.31 |
| BPP 5* | 22 | 52 | 62.1 | 0.75 | 1.77 |
| BPP 6* | 42 | 50 | 75.0 | 0.71 | 2.75 |

Note: *BPP 5 and BPP 6 were comparative samples.

Note: *BPP 5 and BPP 6 were comparative samples.

In the following Examples and Comparative Examples, aluminum p-t-butylbenzoate was used as a nucleating agent.

EXAMPLES 1 TO 7 AND

COMPARATIVE EXAMPLES 1 TO 4

Each of the BPP shown in Table 6 was mixed with the nucleating agent, the amount of which is shown in Table 6, and with 0.05 wt % di-t-butyl-p-cresol, 0.10 wt % pentaerythrityl tetrakis(3-(3,5-di-t-butyl- 4-hydroxyphenyl) propionate), and 0.10 wt % calcium stearate as stabilizers. The ingredients were mixed by Supermixer (Type SMV20) manufactured by Kawada Seisakusho K. K., Japan, and each mixture was pelleted with a twin-screw extruder (Type AS30) manufactured by Nakatani Kikai K. K., Japan to obtain a resin composition. Each pelleted resin composition was formed into test pieces using an injection molding machine (IS-170FII) manufactured by Toshiba Machine Co., Ltd., Japan at a temperature of 220° C. and an in-mold cooling temperature of 50° C. The test pieces obtained were allowed to stand for 2 days in a thermostatic chamber having a relative humidity of 50% and a temperature of 23° C., before being examined for flexural modulus, Izod impact strength (notched), falling weight impact strength, deflection temperature under load, Rockwell hardness, and surface gloss. The results obtained are shown in Table 6.

TABLE 6

| | BPP | Amount of nucleating agent (wt %) | Flexural modulus (kg/cm$^2$) | Izod impact strength (notched) (hr · cm/cm) 23° C. | Izod impact strength (notched) (hr · cm/cm) −20° C. | Falling weight impact strength at −20 °C. (kg · cm) | Deflection temperature under load (C.°) | Rockwell surface hardness (scale R) | Surface gloss (%) |
|---|---|---|---|---|---|---|---|---|---|
| Example 1 | BPP 11 | — | 14,600 | 6.9 | 4.1 | 241 | 128 | 95 | 59 |
| Example 2 | BPP 12 | — | 14,300 | 6.9 | 4.0 | 225 | 127 | 93 | 59 |
| Example 3 | BPP 13 | — | 14,900 | 6.7 | 4.0 | 236 | 128 | 96 | 58 |
| Example 4 | BPP 14 | — | 14,000 | 7.1 | 4.5 | 248 | 124 | 90 | 57 |
| Example 5 | BPP 11 | 0.4 | 16,600 | 6.8 | 4.0 | 232 | 134 | 99 | 64 |
| Example 6 | BPP 12 | 0.4 | 16,500 | 6.5 | 4.0 | 211 | 134 | 97 | 63 |
| Example 7 | BPP 14 | 0.2 | 16,200 | 6.8 | 4.1 | 235 | 132 | 97 | 61 |
| Comparative Example 1 | BPP 5 | — | 11,600 | 5.3 | 3.1 | 165 | 110 | 90 | 51 |
| Comparative Example 2 | BPP 6 | — | 12,800 | 5.3 | 3.0 | 167 | 119 | 93 | 53 |
| Comparative Example 3 | BPP 5 | 0.4 | 13,400 | 5.4 | 3.0 | 152 | 115 | 92 | 54 |
| Comparative Example 4 | BPP 6 | 0.4 | 14,800 | 5.3 | 3.2 | 178 | 125 | 94 | 55 |

EXAMPLES 8 TO 14

Resin compositions were obtained in the same manner as in Example 1, except that the BPP used was changed as shown in Table 7. The resin compositions obtained were evaluated in the same manner as in Example 1. The results obtained are shown in Table 7.

TABLE 7

| | BPP | Amount of nucleating agent (wt %) | Flexural modulus (kg/cm$^2$) | Izod impact strength (notched) (hr · cm/cm) 23° C. | Izod impact strength (notched) (hr · cm/cm) −20° C. | Falling weight impact strength at −20 °C. (kg · cm) | Deflection temperature under load (C.°) | Rockwell surface hardness (scale R) | Surface gloss (%) |
|---|---|---|---|---|---|---|---|---|---|
| Example 8 | BPP 21 | — | 15,300 | 7.1 | 4.2 | 246 | 129 | 96 | 59 |
| Example 9 | BPP 22 | — | 14,800 | 7.1 | 4.2 | 234 | 128 | 94 | 59 |
| Example 10 | BPP 23 | — | 15,300 | 6.9 | 4.1 | 246 | 129 | 97 | 59 |
| Example 11 | BPP 24 | — | 14,400 | 7.3 | 4.7 | 257 | 126 | 92 | 58 |
| Example 12 | BPP 21 | 0.4 | 17,300 | 7.0 | 4.1 | 237 | 135 | 100 | 64 |
| Example 13 | BPP 22 | 0.4 | 16,800 | 6.9 | 4.1 | 222 | 136 | 99 | 63 |
| Example 14 | BPP 24 | 0.2 | 16,300 | 7.1 | 4.6 | 241 | 135 | 98 | 61 |

The resin composition of the present invention is excellent in rigidity, impact resistance, heat resistance, and surface hardness, and is hence useful especially in the fields of automotive parts, electrical or electronic parts, packaging materials, and the like.

While the invention has been described in detail and with reference to specific embodiments thereof, it will be apparent to one skilled in the art that various changes and modifications can be made therein without departing from the spirit and scope thereof.

What is claimed is:

1. A propylene block copolymer comprising:
   (a) a propylene homopolymer part having
   (i) an insoluble amount on xylene extraction at 25° C. of 99.0% by weight or more;
   (ii) an isotactic pentad fraction of 98.5% or more;
   (iii) an isotactic average chain length of 500 or more; and
   (iv) a total amount of fractions having an isotactic average chain length of 800 or more obtained in a column chromatographic separation of 30% by weight or more, and (b) a copolymer part comprising propylene and at least one of ethylene and an α-olefin having from 4 to 12 carbon atoms, wherein at least one of said ethylene and α-olefin is selected from the group consisting of ethylene, 1-butene, and 4-methyl-1-pentene, the proportion of said propylene homopolymer part (a) being from 50 to 97% by weight based on the total amount of said propylene homopolymer part (a) and said copolymer part (b), and the proportion of said copolymer part (b) being from 3 to 50% by weight based on the total amount of said propylene homopolymer part (a) and said copolymer part (b), and wherein said copolymer part (b) has
   (v) an average propylene content (FP) according to the two-site model of from 20 to 80% by mole;
   (vi) a propylene content ($P_P$) of a copolymer ($P_H$) formed at an active site, at which propylene is predominantly polymerized in the two-sited model, of from 65 to 90% by mole;

a proportion of said copolymer ($P_H$) in said copolymer part (b) of from 0.40 to 0.90; and (viii) a block property (CSD) of from 1.8 to 5.0.

2. A process for producing a propylene block copolymer comprising:

(a) a propylene homopolymer part having (i) an insoluble amount on xylene extraction at 25° C. of 99.0% by weight or more;

(ii) an isotactic pentad fraction of 98.0% or more;

(iii) an isotactic average chain length of 500 or more; and (iv) a total amount of fractions having an isotactic average chain length of 800 or more obtained in a column chromatographic separation of 10% by weight or more, and (b) a copolymer part comprising propylene and at least one of ethylene and an α-olefin having from 4 to 12 carbon atoms, the proportion of said propylene homopolymer part (a) being from 50 to 97% by weight based on the total amount of said propylene homopolymer part (a) and said copolymer part (b), and the proportion of said copolymer part (b) being from 3 to 50% by weight based on the total amount of said propylene homopolymer part (a) and said copolymer part (b), said process comprising the steps of:

treating a solid catalyst comprising a magnesium compound, a titanium compound, a halogen-containing compound, and an electron-donating compound, with a titanium compound represented by formula $TiX_a \cdot Y_b$, wherein X represents Cl, Br, or I; Y represents an electron-donating compound; a represents an integer of 3 or 4; and b represents an integer of 3 or less;

washing said solid catalyst with a halogen-containing compound and then with a hydrocarbon to produce a modified polymerization catalyst; and polymerizing propylene and at least one of ethylene and an α-olefin having from 4 to 12 carbon atoms in the presence of said modified polymerization catalyst.

3. A propylene block copolymer resin composition comprising a propylene block copolymer comprising:

(a) a propylene homopolymer part having (i) an insoluble amount on xylene extraction at 25° C. of 99.0% by weight or more;

(ii) an isotactic pentad fraction of 98.0% or more;

(iii) an isotactic average chain length of 500 or more; and (iv) a total amount of fractions having an isotactic average chain length of 800 or more obtained in a column chromatographic separation of 10% by weight or more, and (b) a copolymer part comprising propylene and at least one of ethylene and an α-olefin having from 4 to 12 carbon atoms, the proportion of said propylene homopolymer part (a) being from 50 to 97% by weight based on the total amount of said propylene homopolymer part (a) and said copolymer part (b), and the proportion of said copolymer part (b) being from 3 to 50% by weight based on the total amount of said propylene homopolymer part (a) and said copolymer part (b), and a nucleating agent in an amount of from 0.05 to 30% by weight based on the amount of said propylene block copolymer.

4. A propylene block copolymer as claimed in claim 1, wherein the propylene homopolymer part has a insoluble amount on xylene extraction at 25° C. of 99.7% by weight or more.

5. A propylene block copolymer as claimed in claim 1, wherein the propylene homopolymer part has an isotactic average chain length of 700 or more.

6. A propylene block copolymer as claimed in claim 4, wherein the propylene homopolymer part has an isotactic average chain length of 700 or more.

* * * * *